United States Patent [19]

Hyler

[11] 4,116,298
[45] Sep. 26, 1978

[54] ANGLED ROLL AXIS SUSPENSION FOR OFF-ROAD VEHICLES

[75] Inventor: John H. Hyler, Peoria, Ill.

[73] Assignee: Westinghouse Air Brake Company, Pittsburgh, Pa.

[21] Appl. No.: 818,660

[22] Filed: Jul. 25, 1977

Related U.S. Application Data

[63] Continuation-in-part of Ser. No. 756,128, Jan. 3, 1977, Pat. No. 4,063,361.

[51] Int. Cl.² .............................................. B62D 53/02
[52] U.S. Cl. .................................... 180/139; 180/6.2; 280/109; 280/111
[58] Field of Search ................... 180/11, 51, 134, 135, 180/136, 137, 138, 139, 95 R, 14 R, 14 A, 52; 280/93, 95 R, 97, 111, 113, 125, 126, 109

[56] References Cited

U.S. PATENT DOCUMENTS

| | | | |
|---|---|---|---|
| 801,521 | 10/1905 | Haas | 280/95 R |
| 2,675,247 | 4/1954 | Meng | 280/111 |
| 2,756,834 | 7/1956 | Dauben | 180/11 |
| 2,766,052 | 10/1956 | Nash | 280/109 |
| 3,101,806 | 8/1963 | Salna | 180/52 |
| 3,311,186 | 3/1967 | Kamlukin | 180/70 |
| 3,414,072 | 12/1968 | Hodges | 180/51 |
| 3,426,720 | 2/1969 | Enos | 280/111 |
| 3,524,513 | 8/1970 | Williams | 180/52 |
| 3,669,469 | 6/1972 | Hartlius | 280/111 |
| 3,746,118 | 7/1973 | Altorfer | 180/25 R |

Primary Examiner—Joseph F. Peters, Jr.
Assistant Examiner—R. Schrecengost
Attorney, Agent, or Firm—Leydig, Voit, Osann, Mayer & Holt, Ltd.

[57] ABSTRACT

An off-road vehicle of the large relatively slow earth-moving type having a rear frame with a set of wheels and having, at its forward end, a front frame, for example in the form of an axle assembly, mounting a set of steerable wheels and with means for driving at least one set of wheels. A suspension coupling in the form of a fore-and-aft extending hinge joint is interposed between the two frames to accomodate relative rolling movement. Such hinge joint is positioned adjacent the front wheels and is angled downwardly so that the hinge axis, when extended, intersects the ground at a position which is substantially centered with respect to the rear wheels, with the result that the steering direction remains substantially constant in spite of engagement of humps and hollows by individual ones of the wheels. Alternate embodiments of the invention utilize different drives, steering gear, and cab location. specifically the invention is usable with wagon type steering, Ackermann steering, skid steering or articulated steering, and the drive may be either two-wheel or four-wheel, with tandem wheels or tracks being optional. The cab may be mounted for rolling movement with the rear axle or front axle and either "steered" or "unsteered." The invention is described in connection with both sprung and unsprung axle versions.

17 Claims, 50 Drawing Figures

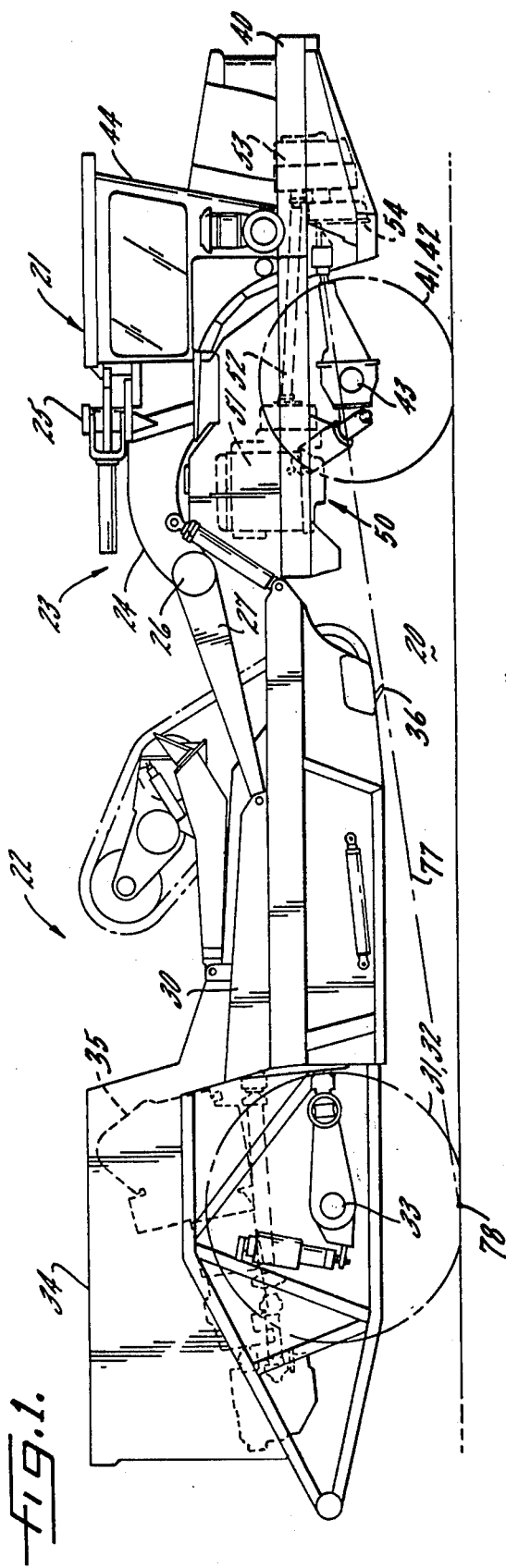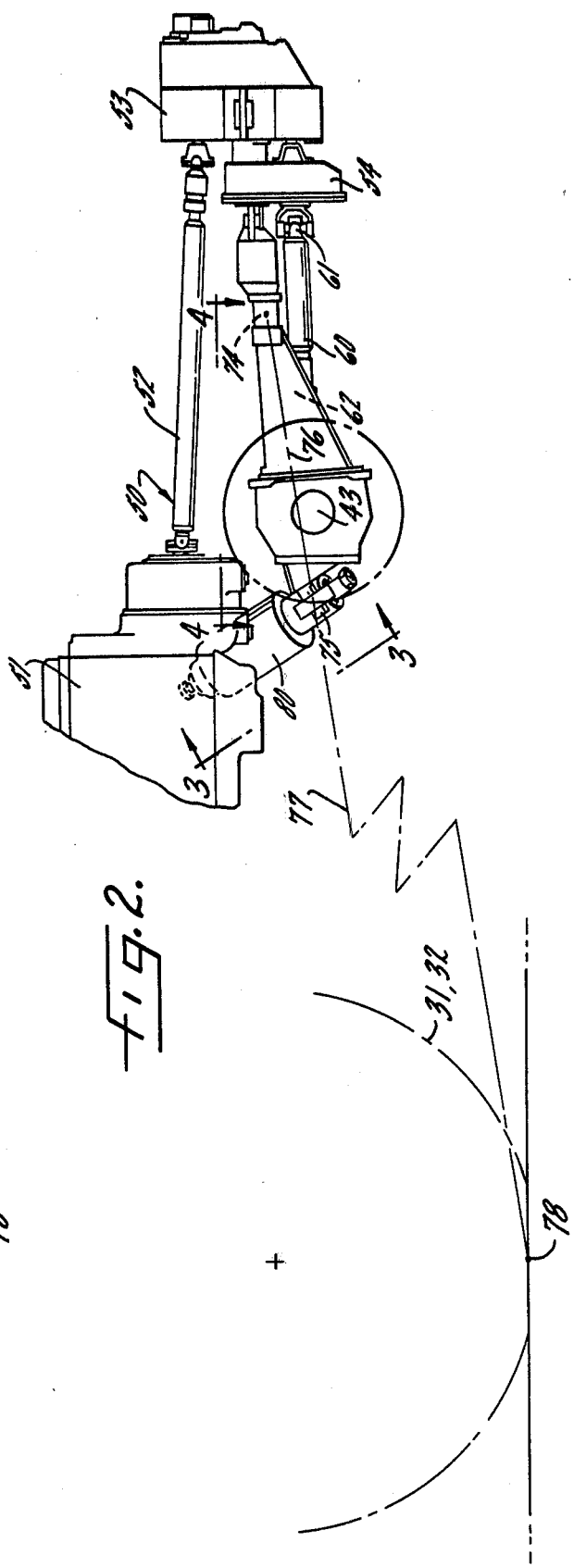

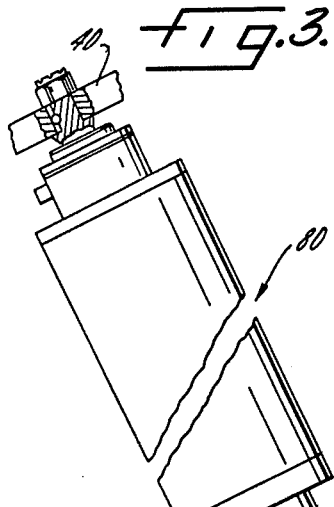
fig.3.
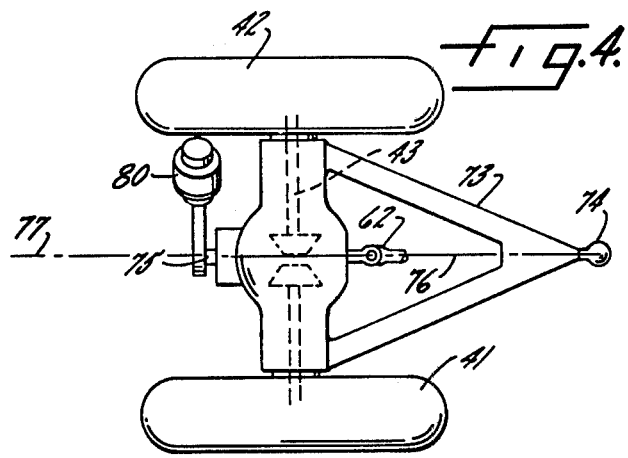
fig.4.
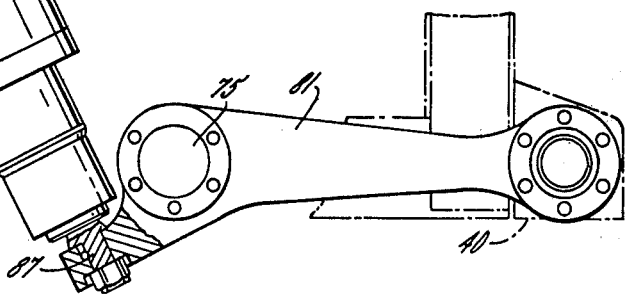
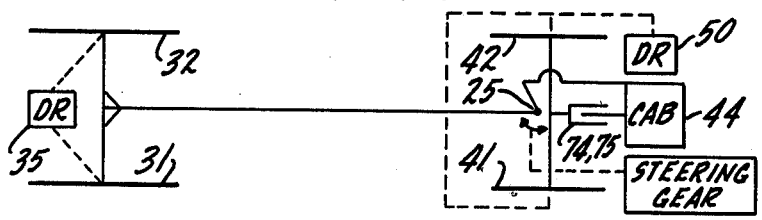
fig.5a.
ALL-WHEEL DRIVE
WAGON STEER AT FRONT AXLE
CAB STEERS WITH FRONT AXLE
CAB DOES NOT OSCILLATE WITH FRONT AXLE
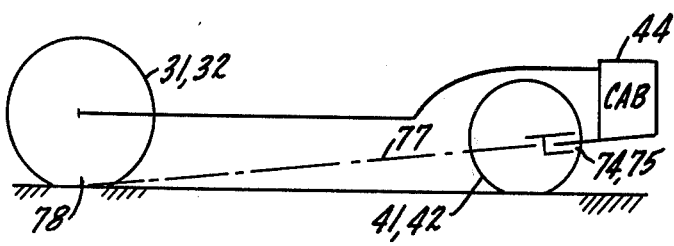
fig.5b.

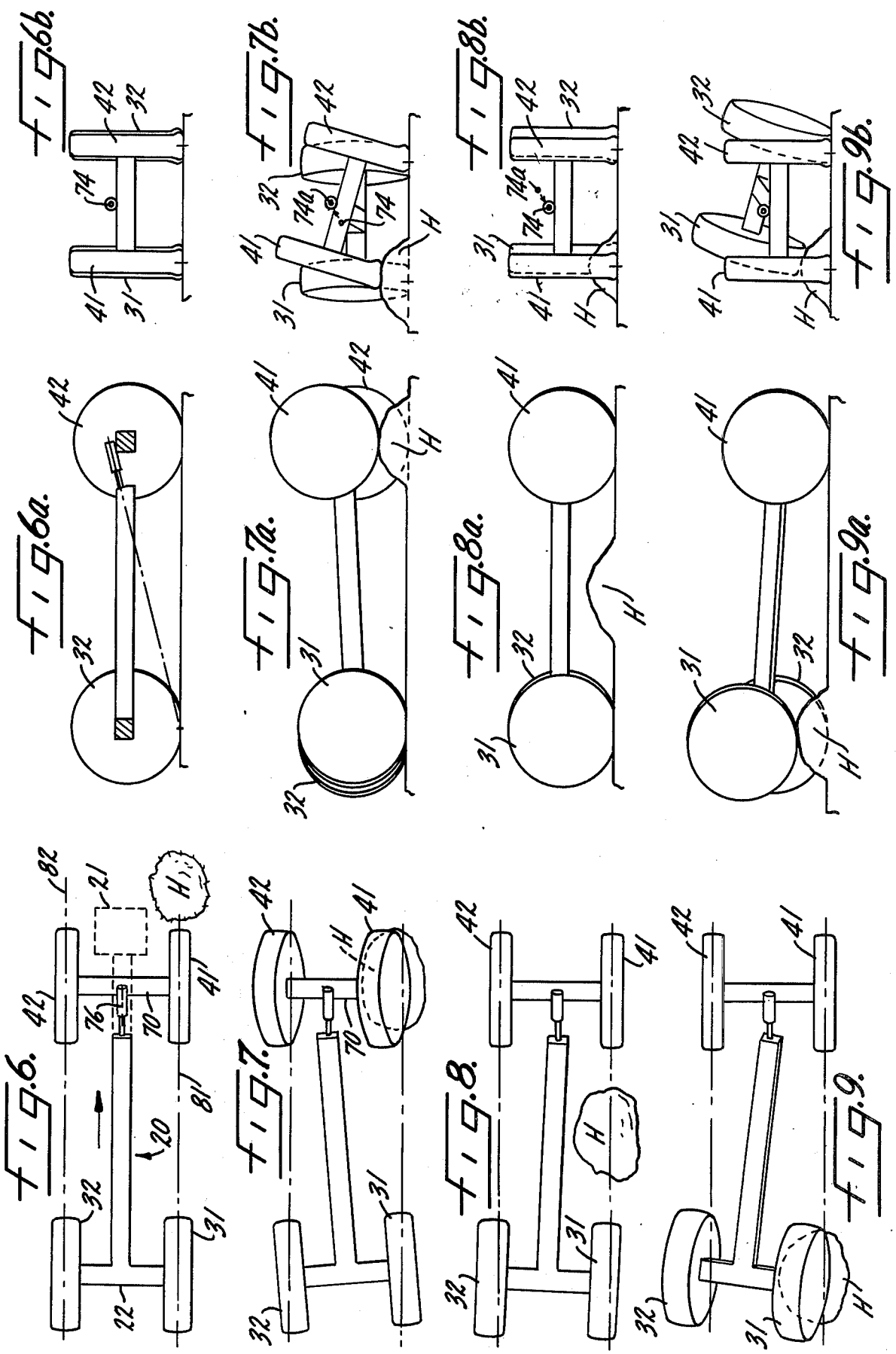

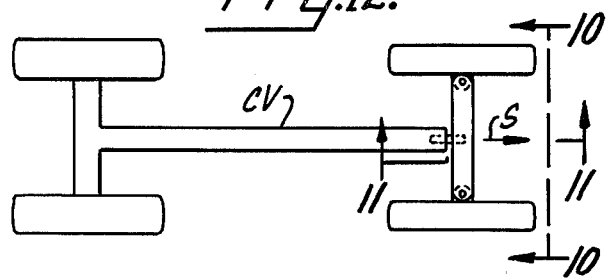
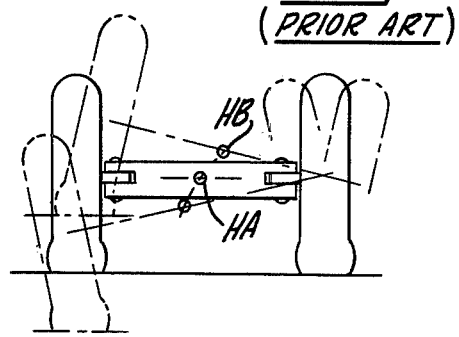
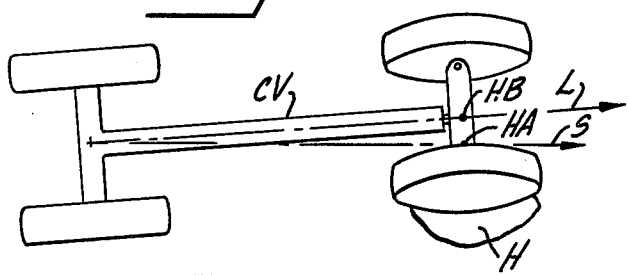
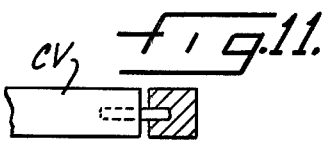
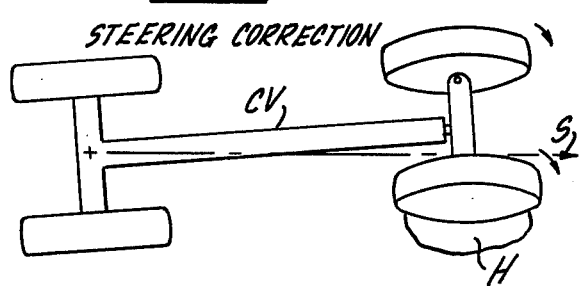
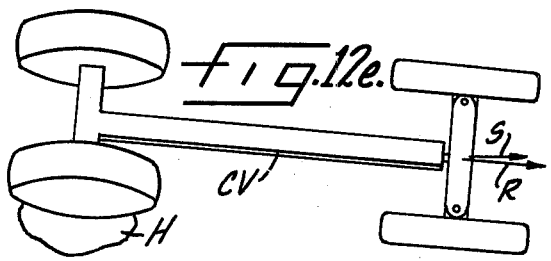
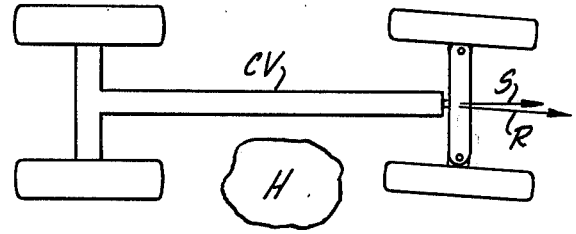
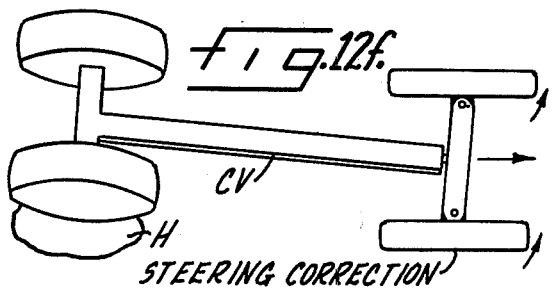
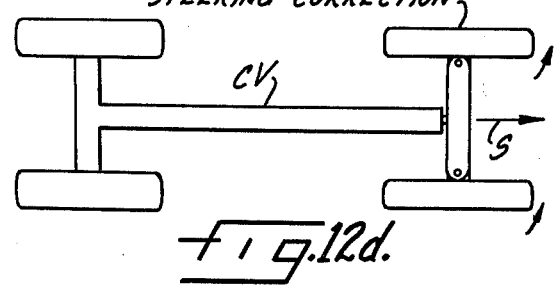
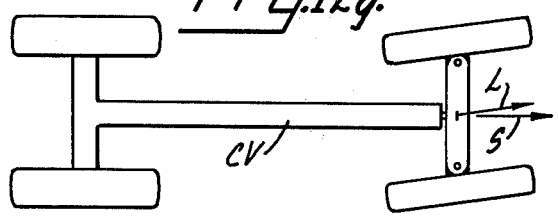
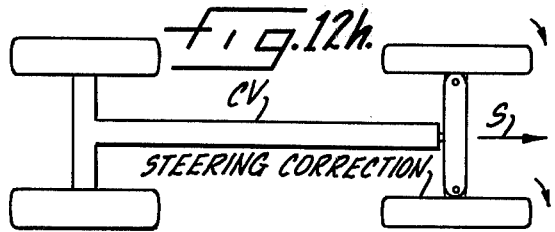

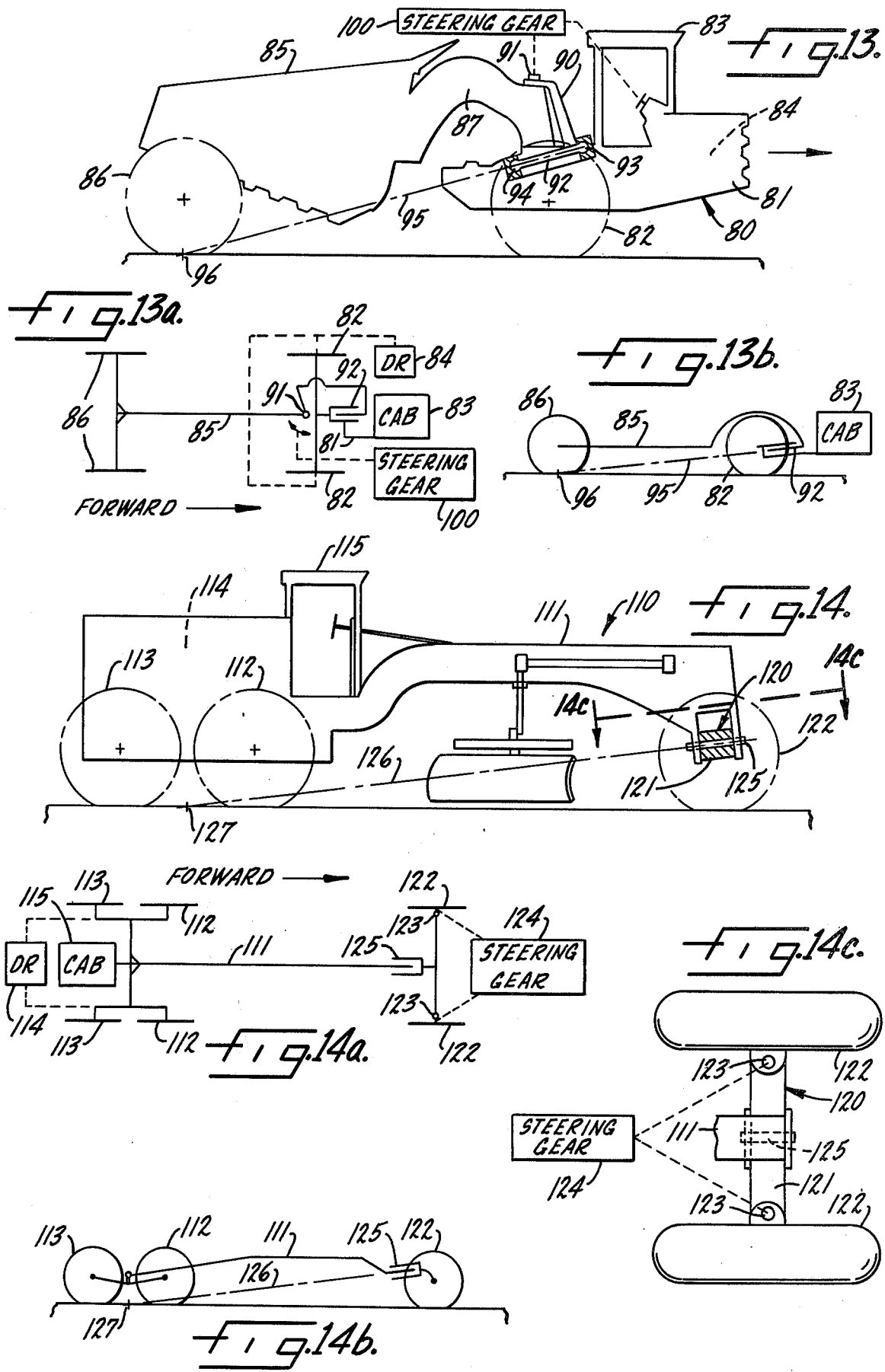

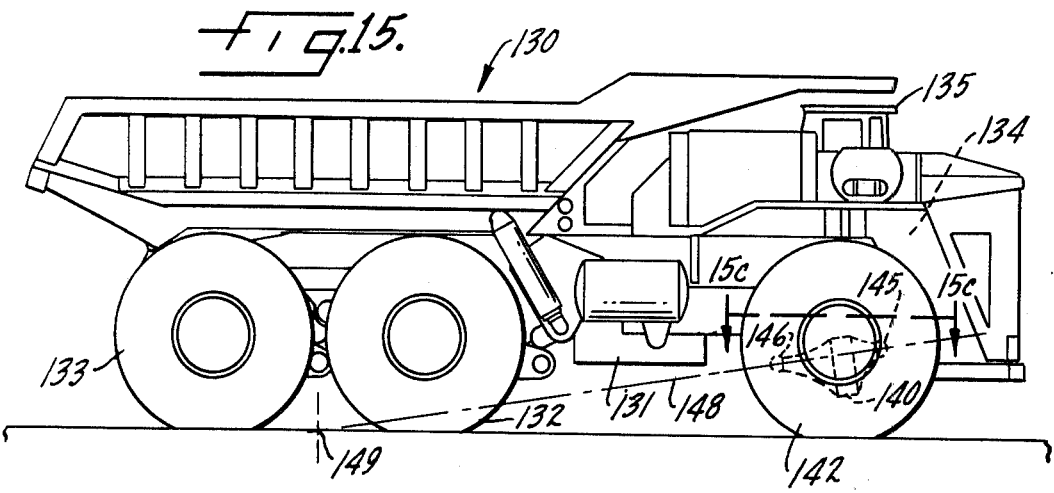
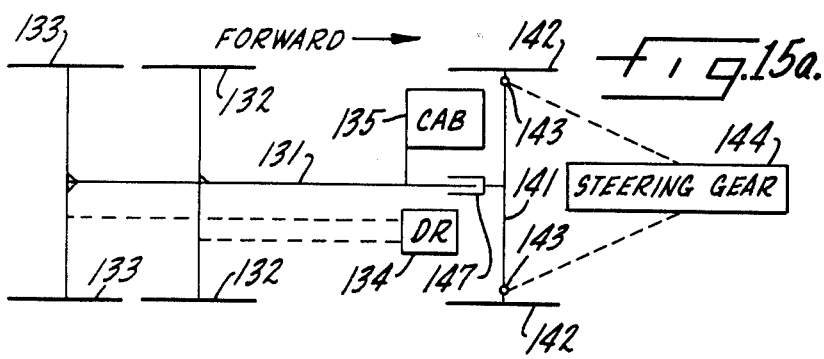
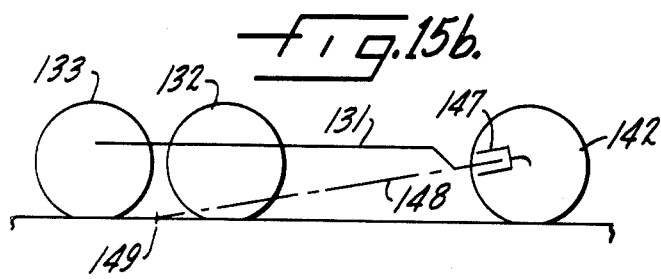
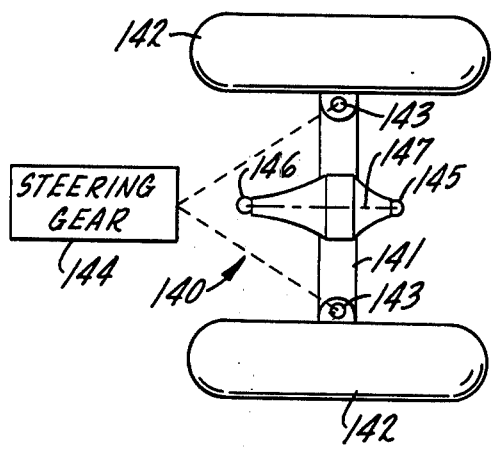
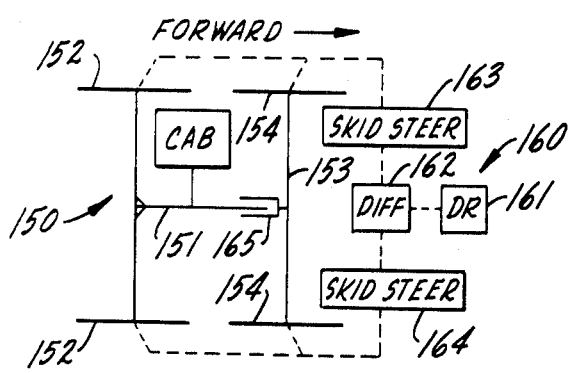
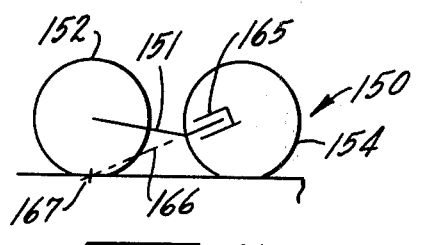

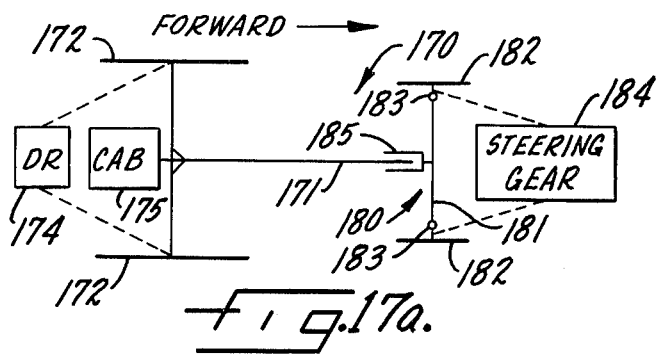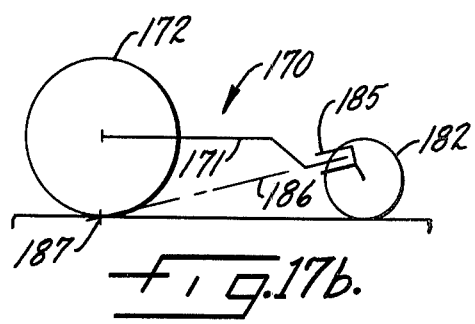
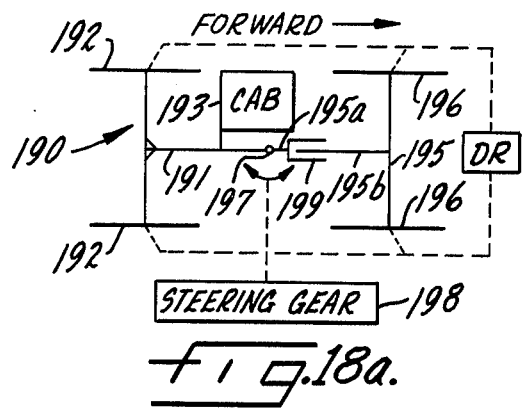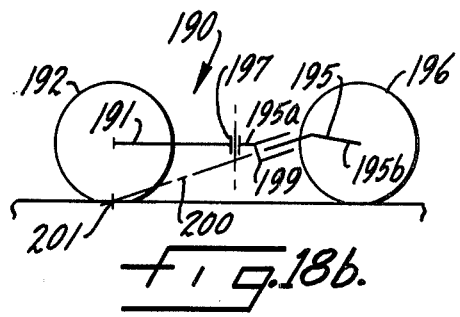
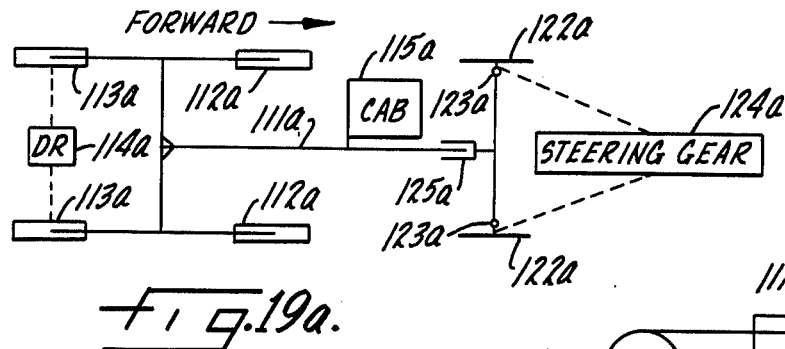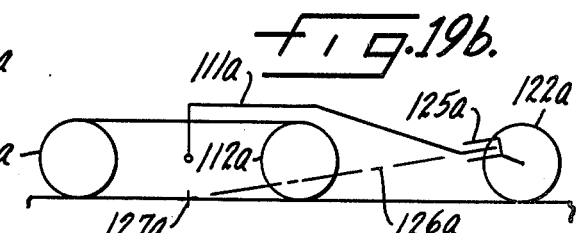
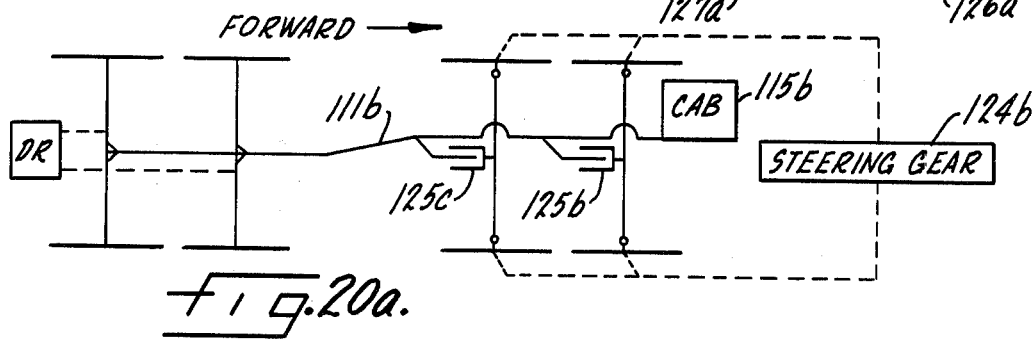
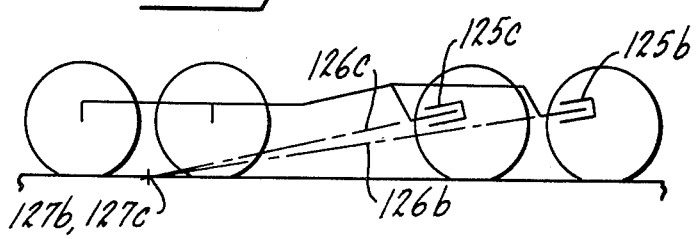

ANGLED ROLL AXIS SUSPENSION FOR OFF-ROAD VEHICLES

This is a continuation-in-part of U.S. application Ser. No. 756,128 filed Jan. 3, 1977 and now U.S. Pat. No. 4,063,361.

BACKGROUND OF THE INVENTION

In the case of road-type vehicles the change in direction of the vehicle which occurs when one of the wheels strikes a hump or a hollow, is relatively insignificant and usually requires no corrective action. The reason for this is that improved roadways, unimproved roadways, and even tilled fields are sufficiently smooth so that any humps and hollows are minor and so quickly traversed that the driver does not feel called upon to make a steering correction.

In conventional designs of heavy off-road earthmoving vehicles it has been the practice to employ roll type suspensions having the same general characteristics as those used in road-type vehicles. More specifically it has been the practice in the design and construction of scrapers, haulers, graders, off-highway trucks, tractors, front end loaders and heavy duty carriers to provide a hinge type connection between the front and rear portions of the vehicle frame, or between the frame and the front axle assembly, which limits relative rolling movement to that about a horizontal axis. Thus in a common type of scraper in which the tractor and trailer portions are integrated into a single articulated frame having rolling rigidity, and in which there is a front axle assembly capable of independent rolling movement, the axis of rolling movement is oriented horizontally both in sprung and unsprung versions. When a major hump or hollow is encountered by one of the front wheels of the vehicle, the lateral tilting of the axle assembly causes the connection between the axle assembly and the frame to shift to the right or to the left. The front end of the vehicle frame is constrained to follow this shifting movement whereas the rear end of the frame is not laterally shifted, with the result that the vehicle frame, incident to ascending a hump, changes its steering direction even though the vehicle steering wheel is maintained stationary. A change occurs in the opposite direction as the wheel descends the hump. In the case of a conventional road vehicle encountering a small irregularity at road speed, the effect of this change in steering direction is momentary, transient, and hardly noticeable. However, in off-road vehicles such as heavy duty scrapers, humps and hollows encountered in normal usage are large and traversed at slow speed so that there is time for the driver to sense an unwanted change in steering direction, both in the ascent and descent of a hump, and to respond to it by the taking of corrective action with the steering wheel.

It can be shown that, using a conventional roll-type suspension, this unwanted change in steering direction also occurs when a rear wheel strikes a hump or hollow, the front and rear wheels normally being acted upon in succession. In either event, the correction which the driver tends to make upon descent is substantially equal to the correction made during ascent, but in the opposite direction, so the corrections nullify one another and there is no net change in direction. The result is that when a driver of an off-road earthmoving vehicle drives over the endless series of humps and hollows which form his "right of way," at usual slow earth-moving speed, he tends to make a corresponding series of corrections in vehicle direction by constant turning of the steering wheel back and forth through a small angle, in a constant effort to direct the vehicle along a straight path. This not only subjects the operator to unnecessary strain and fatigue, but the constant working of the powersteering mechanism, provided on almost all off-road vehicles, results in unnecessary wear and tear and risk of failure of the steering mechanism in the field. The resulting maintenance and down time both involve a large element of expense.

BRIEF DESCRIPTION OF THE INVENTION

It has been found that the above steering difficulties can be overcome by a relatively simple change in the geometry of the suspension usually employed in an off-road vehicle. More specifically, it is found that a suspension may be constructed so that the change in steering direction which tends to occur may be compensated for by a downwardly angling of the hinge which defines the roll axis so that such axis, when extended, intersects the ground at a point which is substantially centered between the rear wheels of the vehicle.

It is, therefore, an object to provide, in an off-road vehicle having accomodation for rolling movement, a hinge coupling, or connection, located adjacent the front wheels, which is angled downwardly to intercept the ground at a position substantially centered between the rear wheels so that steering direction remains substantially constant in spite of engagement of major ground irregularities by individual ones of the wheels. Thus, it is an object to provide a suspension for an off-road vehicle operating at relatively slow speed, in which neither the ascent nor descent of one of the wheels results in any sensible change in direction and thus the driver is not called upon to make constant steering corrections when negotiating rough terrain. He may, instead, hold the steering wheel in a constant position yet steer along a straight line.

Accordingly, it is an object of the invention to provide a design of suspension which enables the operator to steer the vehicle using only a small fraction of the steering movements which are required with a conventional suspension, prolonging the life of the power steering system with which the vehicle is equipped as well as effecting a substantial saving in the mechanical energy required to steer the vehicle.

It is another object of the present invention to provide automatic steering compensation in an off-road earth moving vehicle which may be economically incorporated in the suspension designs of many different types of vehicles, being universally applicable to scrapers, haulers, graders, trucks, tractors, heavy duty carriers and the like; indeed, which provides compensation in any steerable vehicle which is intended to operate at a relatively slow working speed in the face of major ground irregularities.

It is a related object to provide automatic steering compensation in off-road vehicles and which is not limited to use with any particular type of intentional steering mechanism, which is not limited to any particular driving means or limited to any particular mounting of the cab upon the frame and which, finally, is not limited to either sprung or unsprung suspension systems.

Indeed, it is an object to provide an automatic steering compensation system which, notwithstanding its significant features and advantages, may be used not only in new designs of off-highway vehicles but also in existing designs with relatively minor modification, thus making it possible to retrofit vehicles already in use.

It is yet another object of the invention to provide a roll-type suspension which automatically compensates for a change in steering direction upon striking a typically encountered hump or hollow and which slightly over-compensates when striking a particularly large irregularity, producing a psychological effect upon the driver so that he is even less inclined to initiate a steering correction.

Other objects and advantages of the invention will become apparent upon reading the attached detailed description and upon reference to the drawings in which:

DESCRIPTION OF THE INVENTION

FIG. 1 is an elevational view of an earth moving scraper incorporating the present invention.

FIG. 2 is a fragmentary elevation showing the suspension of the front axle assembly of FIG. 1 on a somewhat enlarged scale.

FIG. 3 is a fragmentary view looking along line 3—3 in FIG. 2.

FIG. 4 is a fragmentary plan view of the axle assembly looking along line 4—4 in FIG. 2.

FIGS. 5a and 5b are schematic plan and elevational diagrams of the structure shown in the preceding figures.

FIGS. 6–9 are stop motion views showing an elementary embodiment of the invention and the resulting motion which occurs when the front and rear wheels strike a typical hump encountered in off-road usage.

FIG. 6a is a vertical section and FIGS. 7a–9a are elevational views corresponding to FIGS. 6–9.

FIGS. 6b–9b are front elevations corresponding to FIGS. 6–9, respectively.

FIG. 10 is a front elevational view of a prior art suspension showing the lateral shifting which occurs when one of the wheels strikes a hump or hollow, along 10—10 in FIG. 12.

FIG. 11 is a fragment taken along 11—11 in FIG. 12.

FIG. 12 is a plan view showing a simplified vehicle employing a conventional type of suspension.

FIGS. 12a–12h are stop motion views showing the encountering of a hump by one of the front wheels of the vehicle of FIG. 12 and the subsequent engagement of the same hump by a rear wheel and the points at which the operator tends to make steering corrections.

FIG. 13 is an elevational view showing the present invention applied to an earth hauling vehicle.

FIG. 13a, 13b are schematic plan and elevation diagrams corresponding to FIG. 13.

FIG. 14 is an elevational view showing a form of grader employing the present invention.

FIGS. 14a and 14b are schematic diagrams corresponding to FIG. 14.

FIG. 14c is a fragmentary plan view looking along line 14c–14c in FIG. 14 showing use of Ackermann type steering.

FIG. 15 shows a large truck for hauling earth, ore or the like employing the present invention.

FIGS. 15a, 15b are schematic diagrams viewed in plan and elevation respectively corresponding to FIG. 15.

FIG. 15c is a fragmentary plan view of the front wheel suspension looking along line 15c—15c in FIG. 15.

FIGS. 16a, 16b are schematic plan and elevational diagrams showing the invention applied to a skid-steered tractor.

FIGS. 17a, 17b are schematic plan and elevational diagrams showing the invention applied to an agricultural tractor.

FIGS. 18a, 18b are schematic plan and elevational diagrams showing the invention applied to a tractor having articulated steering.

FIGS. 19a, 19b are schematic plan and elevational diagrams showing the invention applied to half-track carrier.

FIGS. 20a, 20b are schematic plan and elevational diagrams showing the invention applied to a crane carrier, with differential downward angling of the suspensions at the respective pairs of front wheels.

While the invention has been described in connection with certain preferred embodiments, it will be understood that I do not intend to be limited to the particular embodiments shown, but intend, on the contrary, to cover the various alternative and equivalent forms of the invention included within the spirit and scope of the appended claims.

DETAILED DESCRIPTION

Referring now to the drawings there is disclosed in FIG. 1 an off-highway vehicle in the form of a tractor drawn scraper 20 having a tractor assembly 21 and a bowl assembly 22, the two assemblies being interconnected by a draft frame 23 providing rolling rigidity between the bowl and tractor. The draft frame includes a so-called gooseneck 24 which is of rigid construction pivoted to the tractor assembly at 25 for horizontal swinging (steering) movement and carrying a yoke 26, to the lateral ends of which are rigidly secured draft members 27, one on each side of the bowl.

The bowl, indicated at 30, has wheels 31, 32 on an axle 33. In the region between, the largely above, the wheels there is a drive housing 34 containing an engine and drive train 35 which is coupled to the rear axle. At the front of the bowl 30 is a transversely extending digger blade 36.

Turning attention to the tractor assembly 21, it includes a frame 40 supported on a pair of ground-engaging wheels 41, 42 on an axle 43. The frame carries a cab 44. The wheels 41, 42 are driven by a drive train 50 which includes an engine 51, drive shaft 52, transmission 53 and gearbox 54 (FIG. 2).

Leading rearwardly from the latter's housing is a main drive shaft 60 having a first universal joint 61 and a second universal joint 62 (FIG. 4), the second universal joint being coupled to the wheels via a differential 63. The latter is housed in a tractor axle assembly 70 having an axle housing 71 and which has, rigidly secured to it in a centered position, a forwardly extending tongue 73. The latter has a "front" pivot connection with the tractor frame in the form of a ball and socket connection 74. Located to the rear of the axle housing 71 in centered position is a second pivot connection 75, the two pivot connections defining a hinge axis 76 providing relative tilting movement of the axle assembly with respect to the tractor frame. A spring suspension device 80 is interposed between the tractor frame 40 and the rear pivot connection 75 of the axle assembly. The suspension (FIG. 3) includes a panhard type link 81 to keep the axle housing constantly centered with respect to the tractor while accommodating vertical movement of the axle assembly as well as rolling movement about the roll axis as covered in greater detail in copending Hyle and Orth application Ser. No. 756,129 which was filed Jan. 3, 1977 and now U.S. Pat. No. 4,063,361.

In accordance with the present invention the extended axis 77 of the hinge connection formed by the pivots 74, 75 is angled downwardly so as to intersect the ground at a position 78 which is substantially centered between the rear wheels 31, 32 (see also FIG. 4). It is found that when this is done the steering direction remains substantially constant in spite of engagement of major ground irregularities by individual ones of the wheels.

Thus referring to FIGS. 6–9 which are stop motion views showing an elementary embodiment of the invention, and the resulting motion which occurs when the front and rear wheels strike a typical hump encountered in off-road usage, numerals corresponding to FIGS. 1–5 have been applied. The vehicle 20 is shown, in FIG. 6, proceeding along level ground with the wheels tracking straight ahead along tracks 81, 82 but with the track 81 leading to a hump H.

The right front wheel 41 of the vehicle strikes and ascends the hump as shown in FIG. 7. This causes the axle assembly 70 to tilt to the left which results in a shifting of the hinge axis from point 74 leftward along an arcuate path to a new position 74a (FIG. 7b). Such lateral shift of the frame of vehicle 20 (21 and 22 comprising the frame) at its front end but not at its back end causes the frame to be skewed to the left as shown in FIG. 7. This skews the rear wheels 31, 32 from the tracks 81, 82 but the front wheels 41, 42 continue to point straight ahead, with the wheel 42 remaining on its track 82 and the wheel 41 remaining parallel to the nominal track 81.

Since the front wheels, by reason of the invention, remain tracking straight ahead, the operator of the vehicle simply holds the steering wheel steady. Nothing has occurred which has called upon him to make a correction, even though the rear wheels have, by reason of their skewing, tracked at an angle with respect to the nominal tracks 81, 82.

As the vehicle continues its movement and the front wheel 41 descends the hump H, the front axle again becomes horizontal, as shown in FIG. 8b, with the front end of the hinge axis being restored from its laterally shifted position 74a back to its normal position 74. During this movement the front wheels of the vehicle, by reason of the invention, remain tracking straight ahead, with the front wheel 41 being lowered into contact with the nominal track 81. The only result of the striking of the hump H by the right front wheel is that the rear wheels 31, 32 are slightly shifted (to the left) from their centered position with respect to the nominal tracks 81, 82.

When the right rear wheel 31 strikes the same hump, the frame 20 is, as shown in FIG. 9, tilted to the left, causing the center of the rear end of the frame to shift to the left. By contrast, the front end of the frame in the region of the hinge connection 76 does not shift so that the frame, as a whole, undergoes a skewing movement causing a corresponding skewing of the rear wheels. The front axle assembly, and the front wheels, remain unaffected by such skewing and continue tracking straight ahead. The effect upon skewing of the rear wheels is that the rear wheels tend to be steered back into alinement with the nominal tracks 81, 82.

Thus, when the hump H has been descended by the rear wheel 31, which has no effect upon the continued forward tracking of the front wheels, the rear end and the front wheels are both restored to their nominal tracking positions in line with the tracks 81, 82 as set forth in FIG. 6.

It will be seen, then, that by reason of the invention the front wheels 41, 42 continue to point straight ahead as the vehicle traverses rough terrain regardless of the striking of a hump by any of the wheels. The same analysis can be performed showing that the front wheels track straight ahead upon the striking of a hollow. Indeed, the forward tracking of the front wheels is maintained in spite of the striking of a combination of humps and hollows indiscriminantly by any combination of the wheels, either front or rear.

As stated, this effect is brought about by the fact that the rolling or hinge axis, extended at 77, strikes the ground at a point 78 which is substantially centered between the rear wheels. Such result is somewhat surprising since analysis shows that intersection of the axis at a point midway between the wheels is not a theoretical optimum. An optimum condition would be achieved by causing the intersection of the axis with the ground to coincide with the center of the region of ground engagement of the wheels upon respective tilting of the frame in opposite directions. Thus where the vehicle is tilted to the left by reason of a hump H, the extended axis 77 of the hinge should be oriented to strike in the region of ground contact of the left-hand rear wheel 32. Where, on the other hand, the vehicle engages a hump along the left-hand track 82, thus tilting the vehicle to the right, the extended axis 76 should intersect the ground at the region of ground contact of the right rear wheel 31.

However, it will be appreciated that these two conditions are mutually exclusive and consequently the ideal geometry is not achievable. It is, therefore, one of the features of the invention that, by causing the hinge axis to intersect between the wheels, equalized compensation is achieved for both directions of tilting.

The sequential positions shown by the stop motion views in FIGS. 6–9 apply for humps and hollows of a size normally encountered in off-road usage of an earth moving vehicle driven at a relatively slow speed. It is found that where a hump, or hollow, is of greater magnitude than that which has been illustrated, the front wheels do not remain precisely parallel to the nominal track. Under such conditions, instead of precisely correction of steering error there is slight "over-correction" with the front wheels crabbing slightly inwardly away from the direction of tilt. That is, when the tilt of the vehicle is to the left, the front wheels, upon striking an excessively high hump will automatically turn slightly to the right without the operator's intervention. This slight "over-correction" is, however, so slight as to be hardly detectable so that the operator does not feel called upon to make any correction either upon ascending or descending a hump or hollow. Indeed, such slight "over-correction" is psychologically satisfying to the operator and, in any event, the wheels are restored to their original and nominal track as soon as the obstruction has been traversed.

The benefits of the present invention may be more fully appreciated by comparing the automatic compensation sequence which has just been described to the sequence which occurs in a conventional vehicle in which the hinge axis is horizontal. Thus, turning to FIGS. 10-12 there is illustrated, in simplified form, a conventional vehicle CV using Ackermann type steering, FIG. 10 showing the effect, as viewed from the front, of striking a hump or hollow, the effect being further diagrammed in a sequence of stop motion views, FIGS. 12a-12h.

Upon striking of a hump, the horizontal hinge axis HA shifts from its nominal position to the right to a point HB. This causes skewing of the vehicle frame as shown in FIG. 12a. Lacking the compensation of the present invention, the front wheels, as well as the rear wheels, are skewed in the direction shown. As a result the steering of the vehicle shifts from the straight path S to leftward path L without the steering wheel of the vehicle being turned. Since the hump is assumed to be of substantial height and since the vehicle is assumed to be proceeding at relatively slow earthmoving speed, the steering of the vehicle remains along the angularly shifted path L long enough for the vehicle operator to respond to it, so that the operator makes a steering correction, using the steering wheel to turn the front wheels of the vehicle to the right, and back into the straight forward path S, as illustrated in FIG. 12b.

After the hump H has been negotiated and the right front wheel descends back to its normal level, as shown in FIG. 12c, the front wheels remain slightly skewed relative to the vehicle thus causing the vehicle to steer along the path R which is to the right of the straight forward path S. This requires the operator to impart another steering correction, this time to the left, to straighten the wheels with respect to the vehicle so that the steering is restored to the path S as illustrated in FIG. 12d.

However, when the right rear wheel strikes the same hump H, the rear of the vehicle frame is effectively shifted to the left, whereas the front end of the frame, in the region of the front wheels, is not so shifted, resulting in skewing of the frame and the front wheels so that the vehicle tends to steer momentarily along the angled path R, as shown in FIG. 12e. Sensing this change in direction, the operator adjusts the steering wheel by turning it slightly to the left so that the front wheels are again directed along the desired path S as shown in FIG. 12f.

However, just as soon as the right rear wheel descends to its normal level, shifting the rear end of the frame effectively to the right, while the front end of the frame remains laterally stationary, the front wheels will be found to be skewed to the left along the path L. The departure from the desired path is again noted by the operator who then turns the steering wheel to the right slightly, as shown in FIG. 12h, so that the vehicle is restored to its original straight path.

In summary, it is seen that the encountering of a hump successively by the front wheel and then the back wheel at one side of the vehicle causes the operator to make no less than four separate steering corrections (12b, 12d, 12f, 12h).

A similar series of corrections must be made each time that the sheels on one side of the vehicle strike a hollow. The situation becomes even more complicated under actual field conditions where the wheels may strike humps and hollows in various random combinations. The net effect is that the operator, in attempting to negotiate a straight path, must keep constantly twisting the wheel in one direction or the other as he senses, and then attempts to correct for, a change in direction. The effort and attention required to steer a straight path is burdensome and fatiguing to the operator. Moreover, it will be apparent that the constant working of the power steering mechanism greatly increases the amount of wear upon such mechanism requiring the mechanism to be constantly maintained and resulting in high down time expenses in addition to the maintenance expense.

It will be understood that the invention, as described, is not limited to use with a particular vehicle, of the scraper type, illustrated in FIG. 1 and that the invention is indeed applicable to other types of earthmoving, off-road vehicles such as the "hauler" illustrated, in elevation, in FIG. 13. Here the vehicle 80 is made up of a tractor 81 having wheels 82 and a cab 83, with an engine and drive train 84 (not shown). The tractor is coupled to a hauling type trailer 85, which is preferably of the rear dumping type, supported upon wheels 86. The trailer is connected to the tractor by means of a rigid gooseneck 87.

For connecting the front end of the gooseneck to the tractor frame, an intermediate or knuckle member 90 is provided having a vertical hinge connection 91 for steering purposes and a fore-and-aft extending hinge joint 92 for suspension purposes. The vertical hinge is conventional, while a fore-and-aft hingeing is achieved by alined front and rear pivot connections in the form of ball and socket joints 93, 94. The latter are alined along a downwardly extended axis 95 which intersects the ground at a position 96 which is substantially centered between the rear wheels 86.

Steering gear, generally indicated at 100, couples together the steering wheel of the vehicle to the vertical hinge joint 91 so that the joint is effectively rigidified as long as the steering wheel is held in a constant position.

The mechanism illustrated in FIG. 13 has been schematically set forth, in plan and elevation respectively, in FIGS. 13a, 13b.

The sequence of relative movements between the parts, upon striking of a typical hump, is the same as that illustrated in FIGS. 6-9 inclusive.

Application of the present invention to a motor grader 110 is shown in FIG. 14. The vehicle has a longitudinal frame 111 having pairs of wheels 112, 113 arranged in tandem at the rear end. An engine and drive train 114 serves to drive all of the wheels in unison. At the front of the longitudinal frame 111 is mounted a transversely extending axle assembly 120 made up of an axle housing 121 having wheels 122 supported upon steering knuckles 123 which are adjusted by suitable steering gear 124 controlled by the steering wheel in the cab 115. Interposed between the axle housing 121 and the frame 111 is a fore-and-aft extending hinge connection 125, the axis of which is downwardly angled as indicated at 126 so as to intersect the ground at a point 127 which is substantially centered with respect to the four tandem rear wheels.

As a result of the hinge geometry, specifically the downward angling of the hinge axis 126, the encountering of humps and hollows in off-road usage has no effect upon the steering direction of the front wheels, the sequence of the relative movements of the parts being the same as set forth in FIGS. 6-9 inclusive.

The invention may be employed with equal advantage in large off road trucks of the type shown in FIG. 15 and capable of carrying a payload of earth or ore measured in hundreds of tons. The vehicle, indicated at 130, has a longitudinally extending frame 131 mounting pairs of tandem rear wheels 132, 133 driven by an engine and drive train (not shown) but generally indicated at 134 under the control of an operator in a cab 135. Secured transversely at the front end of the frame is an axle assembly 140 having an axle housing 141 mounting wheels 142 on steering knuckles 143 under the control of steering gear 144. The axle assembly is secured to the front end of the frame upon a pair of pivots 145, 146 defining a hinge 147, the extended axis of which is indicated at 148 intersecting the ground at 149 at a point which is substantially centered with respect to the tandem rear wheels 132, 133.

The present invention is particularly important in connection with huge hauling trucks which, because of their size (the tires are typically ten feet in diameter), move ponderously over large humps and hollows and which, absent the invention, would require constant working of the steering wheel by the operator in an effort to hold a straight course.

While the invention has been described in connection with vehicles employing wagon type steering and Ackermann type steering, the invention is not limited thereto and can by employed in vehicles which are skid steered, for example, the skid steered tractor, either tracked or untracked. Such a tractor is indicated schematically at 150 in FIGS. 16a, 16b. The tractor has a frame 151 mounting a pair of rear wheels 152. Extending transversely of the front end of the frame is a front axle 153 mounting a pair of wheels 154. The wheels are all driven simultaneously by a drive train 160 which includes an engine 161, a differential 162 and skid steering control assemblies 163, 164 which may, for example, be simply in the form of brakes which are alternatively actuated to steer the vehicle in one direction or the other. The axle assembly 153 is coupled to the longitudinal frame 151 of the tractor by means of a hinge connection 165 which is downwardly angled along an axis 166 to strike the ground at a point 167 which is substantially centered with respect to the rear wheels 152.

In operation it will be assumed that the right-hand front wheel 154 runs up upon a hump H as described in FIGS. 6 and 7. In absence of the invention, this would normally tend to cause the front wheels of the vehicle to point to the left. However, because of the downward angling of the hinge connection 165, the front wheels 154 continue to point straight ahead, both upon ascent and descent so that the driver does not feel called upon to make any correction in order to proceed along a straight track. The same is true when the same hump, or hollow, is encountered by the rear wheel of the vehicle or, indeed, when humps and hollows are encountered by the individual wheels in any combination.

The present invention has particular importance in its application to typical agricultural or industrial tractors because of the large number of such tractors which are produced and the wide variety of conditions in which they may be called upon to operate. A typical agricultural tractor is shown diagrammatically in plan and elevation views in FIGS. 17a, 17b. The tractor, generally indicated at 170, has a longitudinal frame 171 mounting a pair of rear wheels 172, the wheels being powered by an engine 174 and drive train with controls in a cab 175. Extending transversely at the forward end of the frame is an axle assembly 180 having an axle housing 181 carrying front wheels 182 upon steering knuckles 183, with the direction of steering being controlled by steering gear 184. The frame 171 is connected to the axle housing 181 by means of a hinge connection 185 defining a roll axis 186 which intersects the ground at 187 at a position which is centered with respect to the rear wheels 172.

The motional sequence, and resulting advantages, upon striking a hump or hollow, are the same as previously described in connection with FIGS. 6-9 and need not be repeated.

The invention is similarly applicable, although not to quite the same degree, to articulated tractors as shown in plan and elevation in the schematic diagram, FIGS. 18a, 18b. In these figures the tractor, indicated at 190 has a rear frame 191 mounting wheels 192 and a cab 193 as well as a front frame 195 mounting wheels 196. The front and rear sections, for steering purposes, are articulated at a vertical hinge joint 197, with the articulated position being under the control of steering gear 198.

In carrying out the present invention the front frame 195 is formed in two portions, or sections, 195a, 195b which are joined together by a fore-and-aft extending hinge connection 199 having an extended axis 200 which strikes the ground at a point 201 substantially centered between the rear wheels 192.

The invention may be used with advantage in connection with half track carriers and train carriers. Taking up first the half track carrier schematically illustrated in FIGS. 19a, 19b, it will be noted that the geometry is similar to that of the three axle grader illustrated in FIG. 14. Consequently, corresponding reference numerals have been used to indicate the various parts, with addition of subscript a and the operation is completely analogous to that of the earlier device.

Similarly in the case of the crane carrier illustrated in FIGS. 20a, 20b similar parts have been designated by the same reference numerals with addition of subscript b. However, the crane carrier differs from the preceding devices because of the use of tandem front wheels, the additional front axle assembly being designated by the same reference numerals with addition of subscript c. Where tandem front wheels are employed, the two hinge connections, indicated at 125b, 125c are angled downwardly at different angles so that the extended axes 126b, 126c intersect at coincident positions 127b, 127c substantially centered between the rear set of wheels. As a result the steering direction of both pairs of steerable wheels remains the same in spite of engagement of major ground irregularities by individual ones of the wheels or by combinations thereof.

While the inclined hinge is preferably positioned close to the front wheels of the vehicle, the term "adjacent the front wheels" permits some leeway and the hinge should preferably be located in the front half of the vehicle, and in no event should the angle of downward inclination be greater than 45°.

The term "wheels" used herein is employed in a generic sense and is intended to cover either tracked or untracked wheels. The term "set" of wheels refers either to a pair of wheels or to a total of four wheels where the wheels are employed in tandem. Reference has been made herein both to a structure having front and rear frames and to a structure having a longitudinal frame and an axle housing, in which case the axle housing may be considered to be synonymous with a front frame. The term "means for steering" will be understood to include the various means described herein for accomplishing the steering function in the various types of vehicles including wagon steering, Ackermann steering, articulated steering and skid steering. The term "cab" has been employed to designate the vehicle control station regardless of whether it is open or closed.

The term "off-road" vehicle will be understood to be limited to vehicles which are employed for off-road purposes either fully or on a partial basis and which, because of irregular terrain, are operated at a relatively slow rate of speed. The term "major ground irregularity" includes any irregularity which is substantially greater in size than that encountered under even the poorest of roadway conditions and which takes sufficient time to traverse so that the operator can sense, and respond to, an unwanted change in steering direction.

In the drawings the points of ground intersection are shown as centered both laterally and in the fore-and-aft direction with respect to the rear set of wheels. Lateral centering should preferably be precise for balanced steering compensation in both directions. However, fore-and-aft centering need not be precise, and appeciable compensation effect is achieved even though the point of intersection may be ahead of, or behind, the point shown by an amount of up to twenty percent of the vehicle wheel base. Such departure is contemplated by the term "substantially centered."

While the invention has been described without discussion of springing and damping, it will be understood that springing and damping may, and normally will, be provided in the conventional way at either or both axles without affecting the merits of the invention.

What is claimed is:

1. In an off-road vehicle, the combination comprising a front frame having a front laterally spaced set of ground-engaging wheels, a rear frame having a rear laterally spaced set of ground-engaging wheels, means for coupling the front frame and rear frame together to form an integrated vehicle, means for intentionally steering at least one set of the wheels thereby to steer the vehicle, means for driving at least one set of the wheels, the coupling means being in the form of a fore-and-aft extending hinge joint, the hinge joint being located adjacent the front set of wheels and being angled downwardly with the extended axis thereof intersecting the ground at a position substantially centered between the rear set of wheels so that the steering direction remains substantially constant in spite of engagement of major ground irregularities by individual ones of the wheels.

2. The combination as claimed in claim 1 in which the front wheels are the steered wheels.

3. The combination as claimed in claim 2 in which the front wheels are wagon-steered about a vertical steering axis centered between them.

4. The combination as claimed in claim 2 in which the front wheels are Ackermann-steered.

5. In an off-road vehicle, the combination comprising a front frame having a front laterally spaced set of ground-engaging wheels, a rear frame having a rear laterally spaced set of ground-engaging wheels, means for coupling the front frame and rear frame together to form an integrated vehicle, means for intentionally steering at least the front set of the wheels thereby to steer the vehicle, means for driving at least one set of the wheels, the coupling means being in the form of a fore-and-aft extending hinge joint, the hinge joint being located closely adjacent the front set of wheels and being angled downwardly with the extended axis thereof intersecting the ground at a position substantially centered between the rear set of wheels so that the steering direction remains substantially constant in spite of engagement of major ground irregularities by individual ones of the wheels.

6. The combination as claimed in claim 5 in which the hinge joint is in vertical alinement with the front wheel axis.

7. The combination as claimed in claim 6 in which the front wheels are wagon-steered about a vertical steering axis centered between them, the steering axis being so located as to angularly intersect the hinge joint.

8. In an off-road vehicle, the combination comprising a front frame having a front laterally-spaced set of ground-engaging wheels, a rear frame having a rear laterally spaced set of ground-engaging wheels, a cab rigidly secured to the rear frame and overlying the front frame, means for coupling the front frame and rear frame together to form an integrated vehicle, means for intentionally steering at least the front set of wheels thereby to steer the vehicle, means for driving at least one set of wheels, the coupling means being in the form of a fore-and-aft extending hinge joint, the hinge joint being located adjacent the front set of wheels and being angled downwardly with the extended axis thereof intersecting the ground at a position substantially centered between the rear set of wheels so that the steering direction and cab orientation remain substantially constant in spite of engagement of major ground irregularity, resulting in major rolling movement of the front frame, by one of the front wheels.

9. In an off-road vehicle, the combination comprising a longitudinal frame having a rear laterally spaced set of ground-engaging wheels, a front axle assembly including an axle together with an axle housing and forwardly extending tongue rigidly secured thereto in a centered position, the axle mounting a set of laterally spaced front wheels, means for intentionally steering the front wheels thereby to steer the vehicle, the axle assembly having alined front and rear pivot connections defining an axle roll axis, the front pivot connection being connected to the frame, a spring suspension device interposed between the rear pivot connection and the frame to accommodate vertical and rolling movement of the front wheels as the machine passes over irregular ground, the front and rear pivot connections being so located that the roll axis intersects the ground at a position which is substantially centered between the set of rear wheels so that the steering direction remains substantially constant in spite of engagement of major ground irregularities by individual ones of the wheels.

10. In an off-road vehicle, the combination comprising a longitudinal frame having a rear laterally spaced set of ground engaging wheels, a front axle assembly including an axle together with an axle housing and forwardly extending tongue rigidly secured thereto in a centered position, the axle mounting a set of laterally spaced front wheels, means for intentionally steering the front wheels thereby to steer the vehicle, the axle assembly having alined front and rear pivot connections with the frame defining an axle roll axis and to accommodate rolling movement of the front wheels as the machine passes over irregular ground, the front and rear pivot connections being so located that the roll axis intersects the ground at a position which is substantially centered beween the set of rear wheels so that the steering direction remains substantially constant in spite of engagement of major ground irregularities by individual ones of the wheels.

11. In an off-road vehicle, the combination comprising a tractor frame mounting a cab and having a laterally spaced set of tractor wheels, a trailer frame having a laterally spaced set of trailer wheels, means including a vertical hinge connection for coupling the tractor frame and the trailer frame together to form an integrated vehicle, means controllable from the cab for articulating the vertical hinge connection for thereby intentionally steering the tractor wheels, means on the tractor frame for driving the tractor wheels, the coupling means including a fore-and-aft extending hinge joint, the hinge joint being located adjacent the tractor wheels and being angled downwardly so that its axis intersects the ground at a position substantially centered between the trailer wheels with the result that the steering direction remains substantially constant in spite of engagement of major irregularities by individual ones of the wheels.

12. The combination as claimed in claim 11 in which the vertical hinge connection and fore-and-aft extending hinge joint are closely spaced and share a knuckle connector between them.

13. In an off-road vehicle, the combination comprising a longitudnal frame having a rear laterally spaced set of four ground-engaging wheels in tandem formation, a front axle assembly having an axle mounting a set of laterally spaced front wheels, the axle assembly having a fore-and-aft extending hinge connection with the frame to accommodate rolling movement of the front wheels as the machine passes over irregular ground, a cab on the frame, means controllable from the cab for intentionally steering the front wheels, means on the frame for driving the rear wheels, the hinge connection being angled downwardly to such a degree that the hinge axis intersects the ground at a position which is substantially centered between the four tandem rear wheels so that the steering direction remains unchanged in spite of engagement of major ground irregularities by the wheels on one side of the vehicle.

14. The combination as claimed in claim 1 in which means are provided for driving both sets of wheels and in which skid-steering means are interposed between the wheels and the driving means for causing the wheels on one side of the vehicle to have a speed which temporarily differs from the wheels on the other side of the vehicle.

15. In an off-road vehicle, the combination comprising a longitudinal frame having a rear laterally spaced set of ground-engaging wheels, a front axle assembly mounting a pair of laterally spaced ground-engaging wheels, means for coupling the longitudinal frame and the front axle assembly together to form an integrated vehicle, means for intentionally steering the front wheels thereby to steer the vehicle, means for driving at least one pair of the wheels for propulsion of the vehicle, the coupling means being in the form of a fore-and-aft extending hinge joint located adjacent the front wheels and being angled downwardly so that the extending hinge axis intersects the ground at a position substantially centered between the rear wheels so that the steering direction remains substantially constant in spite of engagement of major ground irregularties by individual ones of the wheels.

16. In an off-road vehicle, the combination comprising a front frame having a front laterally spaced set of ground-engaging wheels, a rear frame having a rear laterally spaced set of ground-engaging wheels, means including an articulated connection between the front frame and rear frame for intentionally steering the vehicle, means for driving all of the wheels of the vehicle simultaneously, the front frame being in two sections with a fore-and-aft extending hinge joint interposed between them, the joint being located adjacent the front set of wheels and being angled downwardly so that the hinge axis intersects the ground at a position substantially centered between the rear set of wheels so that the steering direction remains substantially constant in spite of engagement of major ground irregularities by individual ones of the wheels.

17. In an off-road vehicle, the combination comprising a longitudinally extending frame having a rear laterally spaced set of ground-engaging wheels a first front axle assembly including a first pair of steerable wheels and having a first fore-and-aft extending hinge connection with respect to the frame, a second axle assembly having a second pair of steerable wheels and having a second fore-and-aft extending hinge connection with respect to the frame, the axle assemblies being mounted adjacent one another and the hinge connections being angled downwardly at different angles so that the extended axes thereof both intersect the ground at a position substantially centered between the rear set of wheels so that the steering direction remains substantially constant in spite of engagement of major ground irregularities by individual ones of the wheels.

* * * * *